United States Patent Office 3,041,241
Patented June 26, 1962

3,041,241
METHOD OF TEMPORARILY ALLEVIATING THE SYMPTOMS OF CHRONIC AND ACUTE MYELOCYTIC LEUKEMIAS WITH 2,5-BISMETHANESULPHONOXYHEXANE
Geoffrey Millward Timmis, Robert F. Hudson, and Robin D. Marshall, London, England, and Howard R. Bierman, Duarte, Calif., assignors to Burroughs Wellcome & Co. (U.S.A.) Inc., Tuckahoe, N.Y., a corporation of New York
No Drawing. Filed Nov. 8, 1957, Ser. No. 695,235
1 Claim. (Cl. 167—78)

The present invention relates to a novel compound for the treatment of acute myelocytic leukemias and to a method of its administration.

The compound which is the subject of the present invention is 2,5-bismethanesulphonoxyhexane of the formula:

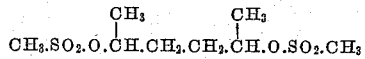

It has been found that whereas related compounds, notably the homologous 1,4-bismethanesulfonoxybutane, have been effective in the treatment of chronic leukemia but ineffective in this respect in acute leukemia, the compound of the present invention is valuable for alleviating the symptoms of both chronic and acute myelocytic leukemias. This is the more surprising in that the compound is rapidly hydrolysed in aqueous solution, and therefore would not be expected to be of value as a therapeutic agent.

*Preparation of the Compound*

The compound may be prepared in the following manner: 29.5 g. of 2,5-hexanediol was dissolved in 79 g. dried pyridine, and 57.3 g. of methane sulphonyl chloride was added with good stirring and cooling. The temperature was not allowed to exceed 0° C. during the addition.

The reaction mixture was taken out of the cooling bath and the temperature allowed to rise to 35° C., when it was again cooled. After standing for 3 hours the reaction mixture was poured into a mixture of 60 ml. of concentrated sulphuric acid and 150 g. of crushed ice.

The precipitate was purified by recrystallization from benzene and melted at 97.5° C.

The compound of the invention is found to be a very potent anti-granulocytic substance which appears to have effects against the immature granulocytes. In certain instances it may be advantageously combined with the compound known as "Myleran" which is the subject of application Serial No. 460,511 filed October 5, 1954, now abandoned. The estimated effective dosage of the compound appears to be within the range of from about 0.2 to about 0.5 mg. per kilogram of bodyweight daily. However, we do not wish to be limited to these values since the dosage can vary substantially in individual cases.

What we claim is:

A method of temporarily alleviating the symptoms of chronic and acute myelocytic leukemias which comprises the administration to the patient of the compound 2,5-bismethanesulphonoxyhexane.

References Cited in the file of this patent
UNITED STATES PATENTS

| | | |
|---|---|---|
| 2,726,162 | Allen | Dec. 6, 1955 |
| 2,816,125 | Allen | Dec. 10, 1957 |
| 2,917,432 | Timmis | Dec. 15, 1959 |

FOREIGN PATENTS

| | | |
|---|---|---|
| 700,677 | Great Britain | Dec. 9, 1953 |

OTHER REFERENCES

Wiley: J. Org. Chem., vol. 22, No. 8, August 1957, pp. 994–995.

Ann. N.Y. Acad. Sci. 68 (3), pp. 657–1266, Apr. 24, 1958.

Conference on Comparative Clinical and Biological Effects of Alkalating Agents, Bethesda, Md., Mar. 28–30, 1957.

Bierman et al.: pp. 1211–22, Ann. N.Y. Acad. Sci. 68 (3), 1958.

Bergel: pp. 1238–1245, Ann., N.Y. Acad. Sci. 68 (3), 1958.

Haddow et al.: Acta Univ. Intern. Contra. Cancrum, 7: 469, 1951.